United States Patent [19]

Trageser

[11] Patent Number: 4,633,479
[45] Date of Patent: Dec. 30, 1986

[54] ALIGNMENT SYSTEM FOR A CONFOCAL UNSTABLE LASER RESONATOR

[75] Inventor: Milton B. Trageser, Winchester, Mass.

[73] Assignee: The Charles Stark Draper Laboratory, Inc., Cambridge, Mass.

[21] Appl. No.: 640,504

[22] Filed: Aug. 13, 1984

[51] Int. Cl.$^4$ .............................................. H01S 3/08
[52] U.S. Cl. ................................... 372/107; 372/108; 372/95; 372/103; 372/99
[58] Field of Search ................... 372/107, 108, 92, 95, 372/99, 98, 97, 103

[56] References Cited

U.S. PATENT DOCUMENTS

| | | | |
|---|---|---|---|
| 4,123,150 | 10/1978 | Sziklas | 372/97 |
| 4,151,487 | 4/1979 | Chin | 372/103 |
| 4,393,303 | 7/1983 | Spinhirne | 372/95 |
| 4,520,486 | 5/1985 | Lavarini | 372/95 |

OTHER PUBLICATIONS

Chester; "Beam Steering in Confocal Unstable Resonators"; *IEEE JQE*, vol. QE-9, No. 2, Feb. 1973.

*Primary Examiner*—Leon Scott, Jr.
*Attorney, Agent, or Firm*—Weingarten, Schurgin, Gagnebin & Hayes

[57] ABSTRACT

The disclosed alignment system for a reciprocal path confocal unstable laser resonator of the present invention makes possible extremely precise cavity boresight alignment in a manner neither requiring a separate alignment laser or other alignment reference source, nor requiring physically large optical components that heretofore have placed severe constraints on system integrability, among other advantages. In accordance with the present invention, means are disclosed operative during the interpulse interval of the confocal unstable laser resonator for extracting at least two received energy beams of selected magnification factor and correspondingly reduced beam size out of the optical cavity of the confocal unstable laser resonator, and means are disclosed operative in response to the at least two received optical energy beams of selected magnification factor and beam size for determining the relative misalignment therebetween to provide an extremely precise signal indication of cavity boresight alignment. The extracting means is positionable both within and without the optical cavity of the confocal unstable laser resonator.

5 Claims, 8 Drawing Figures

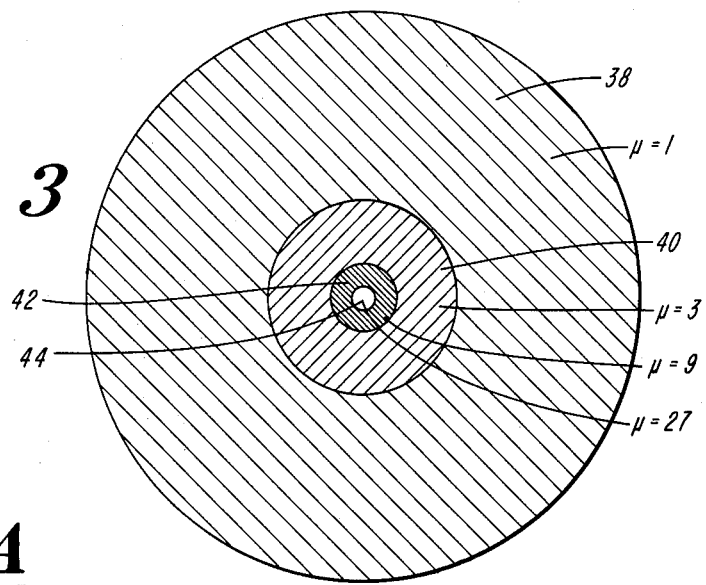
FIG. 3
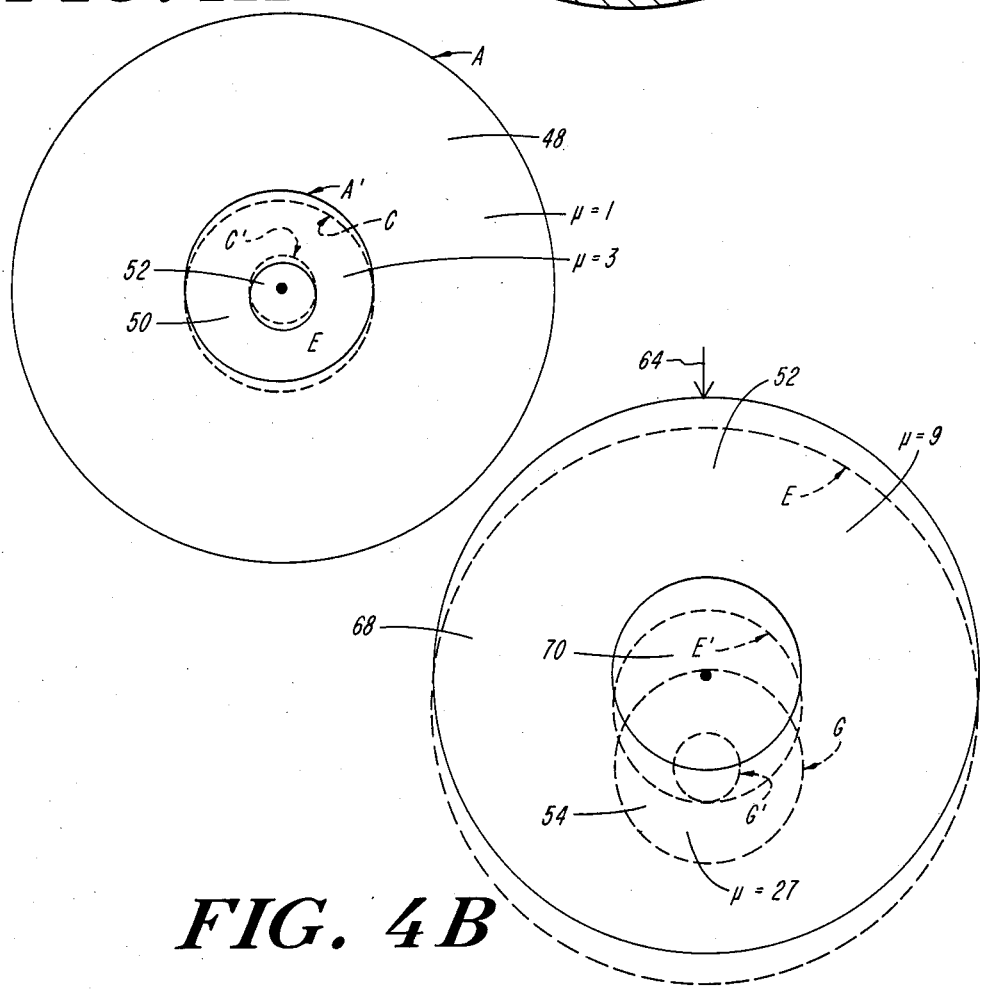
FIG. 4A
FIG. 4B

ALIGNMENT SYSTEM FOR A CONFOCAL UNSTABLE LASER RESONATOR

FIELD OF THE INVENTION

This invention is directed to the field of optics, and more particularly, to a novel alignment system for a confocal unstable laser resonator.

BACKGROUND OF THE INVENTION

In many applications, it is desirable to both transmit outgoing pulses of laser energy and to receive energy from the target during the interpulse intervals along the same but reciprocal optical path. The alignment system for such a reciprocal path optical system typically separates the outgoing and received optical energies along a common optical aperture, detects the relative mis-alignment therebetween, and corrects the relative mis-alignment between the outgoing and received optical energies to maintain subsequent pulses both on-target and infocus. Such optical systems are often called upon to provide very high-power and extremely precise alignment accuracy while minimizing the physical dimensions of the various system components to provide maximum system integrability.

SUMMARY OF THE INVENTION

The present invention includes a confocal unstable laser resonator having a primary reflector and a spaced secondary reflector defining an optical cavity of preselected magnification "M" that is operative to produce outgoing pulses of high-energy laser light along an optical path and to receive energy along the same but reciprocal optical path during the interpulse intervals. The received energy during the interpulse intervals oscillates between the cavity mirrors of the confocal unstable laser resonator successively converging toward the axis of the resonator in such a way as to define for each round trip oscillation "n" an annular beam collimated when illuminating the primary reflector having a magnification factor "$M^n$" and having a "telescoped" spot size inversely proportional to the magnification factor. Means operative during the interpulse intervals are provided for imaging a preselected pair of annular beams having selected different magnification factors on a sensor. Aligned outgoing and received energy produce coaxially aligned images of the preselected pair of annular beams having selected different magnification factors. Mis-aligned outgoing and received energy produce co-axially mis-aligned images of the preselected pair of annular beams having selected different magnification factors that are spaced-apart a distance that is a multiple of the actual relative mis-alignment. The multiplication of the actual relative mis-alignment of the alignment system for a confocal unstable laser resonator of the present invention thus provides extremely precise alignment accuracy. The imaging means includes optical components that have physical dimensions that need be no larger than the "telescoped" spot sizes of the preselected pair of annular beams of selected different magnification factor.

In one embodiment, the imaging means is operatively coupled interiorly to the confocal unstable laser resonator and in the neighborhood of the primary mirror. In another embodiment, the imaging means is operatively coupled exteriorly of the confocal unstable laser resonator and in communication with the optical cavity via an aperture in the primary reflector.

BRIEF DESCRIPTION OF THE DRAWINGS

These and other features and advantages of the present invention will become apparent as the invention becomes better understood by referring to the following solely exemplary and non-limiting detailed description of the preferred embodiments, and to the drawings, wherein:

FIG. 3 is a schematic diagram illustrating an aligned received beam pattern in the neighborhood of a primary reflector of the alignment system for a confocal unstable laser resonator according to the present invention;

FIG. 4A and FIG. 4B are schematic diagrams illustrating a co-axially mis-aligned received beam pattern in the neighborhood of the primary reflector of the alignment system for a confocal unstable laser resonator according to the present invention;

DETAILED DESCRIPTION OF THE PREFERRED EMBODIMENTS

Figure 1:
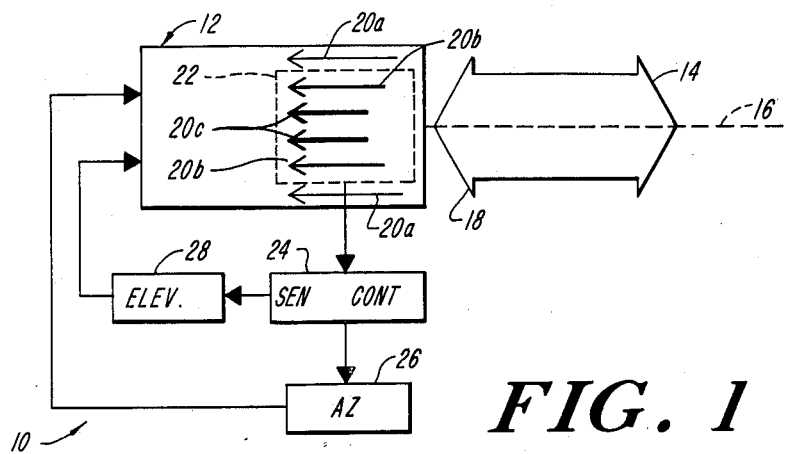
FIG. 1 is a block diagram of an alignment system for a confocal unstable laser resonator according to the present invention.

Referring now to FIG. 1, generally designated at 10 is a block diagram illustrating the novel alignment system for a confocal unstable laser resonator according to the present invention. The system 10 includes a confocal unstable laser resonator generally designated 12 operative in known manner to sequentially provide pulses of laser light 14 along an optical path 16, and to receive energy 18 along the same but reciprocal optical path during the interpulse intervals. Any suitable lasing medium, such as a flowing gas mixture, and any suitable excitation, such as an electrical pump, may advantageously be employed.

The received energy 18 oscillates in the optical cavity of the laser resonator 12 in such manner that it is selectively magnified and "telescopically" reduced in size with each round trip oscillation as schematically illustrated by the arrow pairs 20a, 20b, and 20c. The relative length of the pairs 20a, 20b, 20c illustrates the "telescoped" spot size of the received energy, and the relative intensity thereof illustrates the magnification of the received energy. A light extractor schematically illustrated by a dashed box 22 to be described is provided for deviating any two or more received beams of selected magnification and spot size, for example 20b, 20c, onto a sensor and controller 24. The light extractor 22 can advantageously be coupled both within and outside of the optical cavity of the laser resonator 12.

The sensor and controller 24 is operative during the interpulse intervals to detect the relative mis-alignment between the two or more selected received beams 20b, 20c of selected different magnification and spot size, and to produce therefrom in a well-known manner an azimuthal control signal 26 and an elevational control signal 28 that maintain subsequent outgoing pulses 14 both on-target and in-focus.

The mis-alignment of the two or more selected received beams 20b, 20c of selected different magnification is a multiple of the actual relative mis-alignment of the outgoing and received energy 14, 18. The alignment system of the present invention thus provides an extremely precise signal indication of the actual relative mis-alignment between the outgoing and received energy. The light extractor 22 has physical dimensions that need be no larger than the physical dimensions that correspond to the larger of the "telescoped" spot sizes of the beams 20b, 20c of selected magnification and spot size, thereby minimizing materials costs, relaxing installation space requirements, and facilitating system maintenance, replacement, and integrability, among other advantages.

Figure 2:
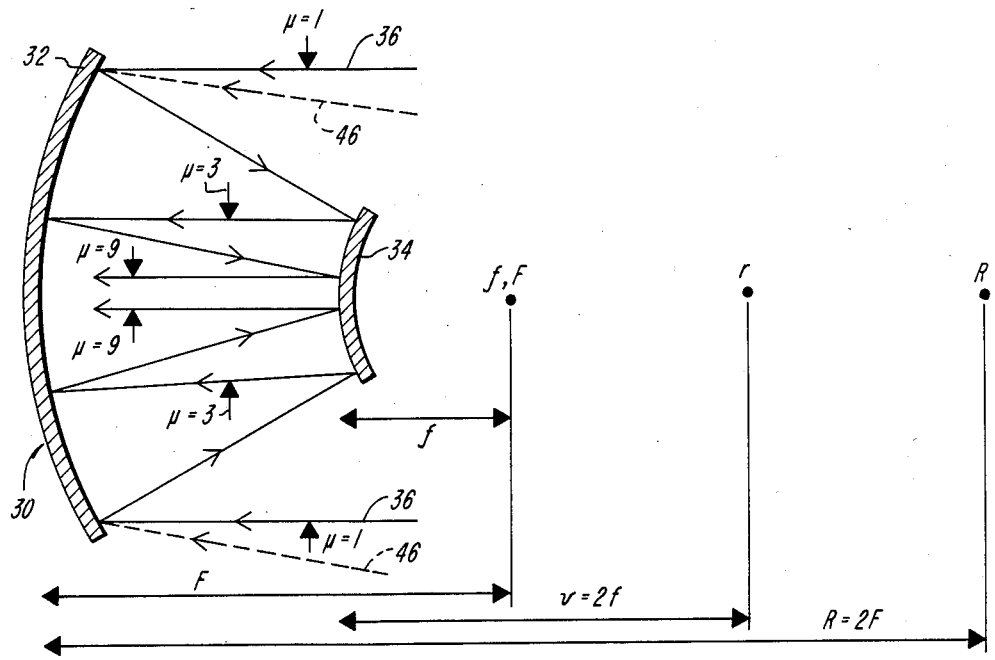
FIG. 2 is a diagram illustrating an optical cavity of a confocal unstable laser resonator in receiving energy of the alignment system for a confocal unstable laser resonator according to the present invention.

Referring now to FIG. 2, generally designated at 30 is a diagram illustrating an optical cavity of a confocal unstable laser resonator receiving optical energy from a target according to the present invention. A first concave primary reflector 32 having a center of curvature "R" and a focal point "F", where "R=2F", is in spaced-apart relation with a convex secondary reflector 34 having a center of curvature "r" and a focal point "f", where "r"=2f", and where the focal points "f", "F" are coincident. The concave primary reflector 32 and the convex secondary reflector 34 preferably are spherical segments, although parabolic and other conical segments can be employed as well.

The optical cavity 30 has a predetermined magnification factor "M". The magnification factor "M" of the optical cavity 30 is determined by the ratio of the diameters of the cavity mirrors 32, 34 and/or by the ratios of the focal lengths. In exemplary embodiment, the ratio of the diameters of the cavity mirrors 32, 34 is selected to provide an exemplary magnification factor of "three", although any other suitable magnification factor can be employed as well without departing from the inventive concept.

Collimated received energy during the interpulse intervals oscillates between the cavity mirrors 32, 34, and in such a way that the energy radially collapses toward the axis of the optical cavity successively with each round trip oscillation "n" thereof producing a collimated annular beam when illuminating the primary reflector having a magnification "$\mu$" and a spot size inversely proportional to the magnification, where "$\mu = M^n$". Whenever the outgoing and received energies are aligned, the centroids of the sensor plane images of corresponding ones of the annular beams of different magnification and spot size are co-axially aligned. Whenever the outgoing and received energies are relatively mis-aligned, the sensor plane images of the centroids of corresponding ones of the annular beams of selected magnification and spot size are located relative to each other at points that are multiples of the actual relative mis-alignment.

Referring now to FIGS. 2 and 3, collimated energy 36 received along an optical path that is co-axially aligned with the optical axis of the optical cavity 30 oscillates between the reflectors 32, 34 producing concentrically aligned and collimated annular beams 38, 40, 42, and 44 respectively having magnifications of 1, 3, 9, and 27 for n=0, 1, 2, and 3. In FIG. 3, the annular beams 38, 40, 42, 44 of the received energy are projected onto a plane whose normal is coincident with the optical axis of the optical cavity and positioned in the neighborhood of the reflector 32 (FIG. 2) for the exemplary magnification factor of three of the optical cavity.

Referring now to FIGS. 2 and 4, collimated energy 46 received along an optical path that is out of co-axial alignment with the optical axis of the optical cavity oscillates between the reflectors 32, 34 producing concentrically mis-aligned and collimated annular beams 48, 50, 52, 54 respectively having magnifications of 1, 3, 9, and 27 for n=0, 1, 2, and 3. In FIGS. 4A, 4B, the annular beams 48, 50, 52, 54 of the received energy are projected on a plane whose normal is coincident with the optical axis of the cavity and positioned in the neighborhood of the reflector 32 (FIG. 2) for the exemplary magnification factor of the optical cavity, for an exemplary off-axis actual relative mis-alignment of one-sixth milliradian, and for a scale of "1" in FIG. 4A and for a scale of "9" in FIG. 4B. The following table includes for each round trip oscillation "n" of the received energy the diameter of the beam edges designated A, A', C, C', E, E', G, G' of the annular beams 48, 50, 52, 54 in the neighborhood of the primary reflector 32 designated "P", as illustrated in FIG. 4, and includes the diameter of the beam edges B, B', D, D', F, F' of the annular beams in the neighborhood of the secondary reflector 34 designated "S", not illustrated in the Figures. The off-optical axis location of the corresponding beam edges designated "OFF OPT. AXIS", together with annular beam diameter and propagation information are also included. The data is listed for the exemplary one-sixth milliradian off-axis received collimated energy, for a primary reflector 32 having an exemplary dimension of "1", a secondary reflector having an exemplary dimension of "⅓", and for radii of curvature of the primary reflector and secondary reflector of "9" and "3" respectively.

| n | MIRROR | BEAM EDGES | PROPA-GATION | DIAM-ETER | OFF OPT. AXIS |
|---|--------|------------|--------------|-----------|---------------|
| 0 | P | A | 1/6 | 1 | 0.000 |
| 0 | P | A' | — | ⅓ | 0.500 |
|   | S | B | — | ⅓ | 0.500 |
|   | S | B' | — | 1/9 | 0.667 |
| 1 | P | C | ½ MR | ⅓ | 2.000 |
| 1 | P | C' | — | 1/9 | 2.167 |
|   | S | D | — | 1/9 | 2.167 |
|   | S | D' | — | 1/27 | 2.222 |
| 2 | P | E | 1.5 MR | 1/9 | 6.667 |
| 2 | P | E' | — | 1/27 | 6.722 |
|   | S | F | — | 1/27 | 6.722 |
|   | S | F' | — | 1/81 | 6.741 |
| 3 | P | G | 4.5 | 1/27 | 20.222 |
| 3 | P | G' | — | 1/81 | 20.241 |

Figure 5:
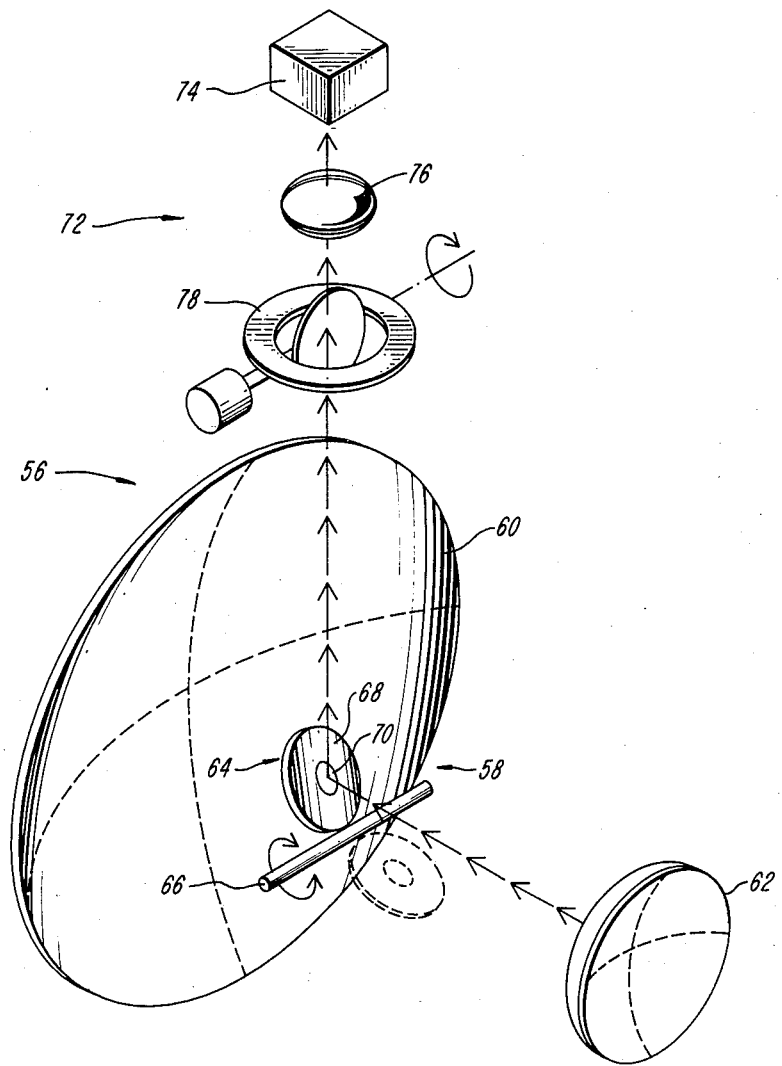
FIG. 5 is an isometric diagram illustrating one embodiment of the alignment system for a confocal unstable laser resonator according to the present invention.

Referring now to FIG. 5, generally designated at 56 is one embodiment of an intracavity alignment system for a confocal unstable laser resonator according to the present invention. The system 56 includes a light extractor generally designated 58 positionable during the interpulse intervals along the optical axis and within the optical cavity defined by a concave primary reflector 60 and a convex secondary reflector 62. The light extractor 58 includes a mirror generally designated 64. The mirror 64 is selectively positioned at an angle to the optical axis of the optical cavity during the interpulse intervals by any suitable means such as by a rotatable arm 66. The mirror 64 includes a partially-silvered elliptically annular portion 68 and a contiguous and concentric fully-silvered central portion 70. The annular portion 68 of the extractor 64 is dimensioned to correspond to the dimension of an annular beam of selected magnification, and the central portion 70 thereof is dimensioned to correspond to the dimension of an annular beam of selected different, and preferably successive, magnification. As can be seen in FIG. 4B by way of example, the extractor 64 is shown in solid outline and has fully and partially silvered mirrored portions 68, 70 dimensioned to correspond to the dimensions of the annular beams 52, 54 having selected different magnifications of "nine" and "twenty-seven", respectively.

Optics generally designated 72 and a sensor 74 are positioned to receive light reflected thereto off of the light extractor 64 during the interpulse intervals. The optics 72 includes a lens 76 operative to image the extracted annular received beams of selected different magnification and spot size on the sensor 74. A butterfly valve 78 of known design is operative to sequentially occlude corresponding ones of the annular received beams of selected different magnification in such a way that the sensor 74 at any given time is responsive to only one of the annular received beams of selected different magnification.

In operation, received energy oscillates between the cavity mirrors 60, 62 producing annular beams having a magnification "$M^n$" and a spot size inversely proportional to the magnification that successively converge toward the axis of the optical cavity with each round trip oscillation "n". For the exemplary embodiment, the partially silvered portion 68 of the light extractor 64 is dimensioned to deviate a portion of the annular beam of magnification "nine" through the optics 72 and onto the sensor 74. The remaining portion of the annular beam of magnification "nine" passes through the partially silvered portion 68 of the extractor 64 and is deviated off the primary reflector 60 in a converging beam toward the secondary reflector 62. The secondary reflector 62 deviates it thereoff in a collimated beam having a magnification of "twenty-seven" and correspondingly reduced spot size back toward the primary reflector 60. The fully-silvered central portion 70 of the extractor 64 deviates the annular beam of magnification "twenty-seven" through the optics 72 and onto the sensor 74.

Figure 6:
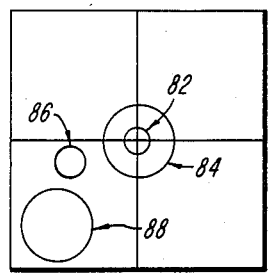
FIG. 6 is a sensor plane diagram illustrating exemplary images produced by the alignment system for a confocal unstable laser resonator according to the present invention.

As shown in FIG. 6, collimated received energy on-axis with the optical axis of the optical cavity produces concentrically aligned spots generally designated 82, 84 on the sensor image plane, and collimated received energy off-axis with the optical axis of the optical cavity produces spaced-apart spots generally designated 86, 88 on the sensor image plane that are spaced apart by a factor that is a multiple of the actual relative mis-alignment of the received energy off of the optical axis of the optical cavity. It will be appreciated that the extracting and imaging of any two or more received beam images of selected different magnification and spot size of the present invention thus provides an extremely precise signal indication of relative mis-alignment in a manner that does not require separate and independent active alignment components, and that has physical dimensions that are reduced in size relative to the optical aperture of the confocal unstable laser resonator.

Figure 7:
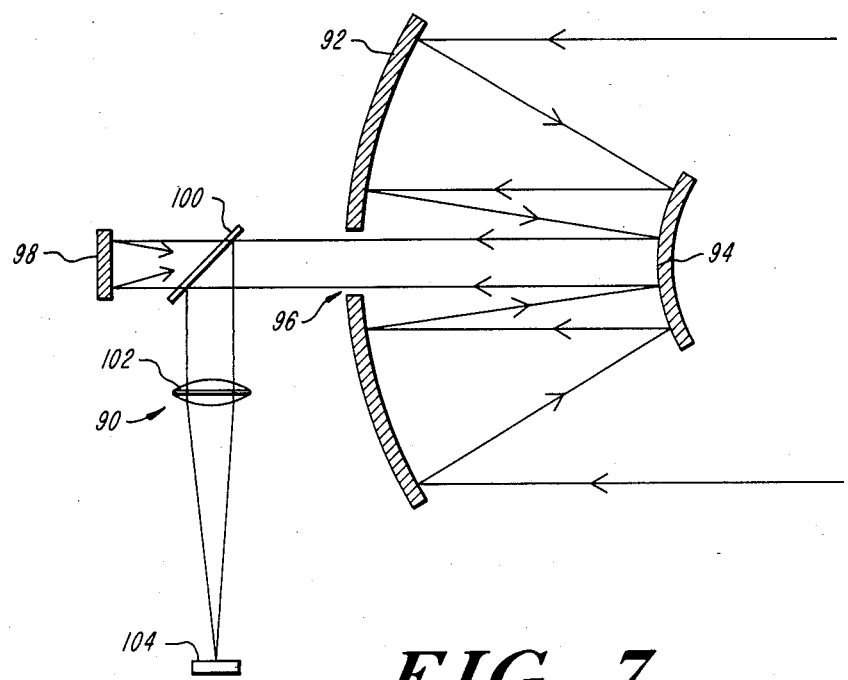
FIG. 7 is a schematic diagram illustrating a further embodiment of the alignment system for a confocal unstable laser resonator according to the present invention.

Referring now to FIG. 7, generally designated at 90 is one embodiment of an extracavity alignment system for a confocal unstable laser resonator according to the present invention. The system 90 includes a concave primary reflector 92 and a convex secondary reflector 94 in spaced-apart relation thereto defining an optical cavity of the confocal unstable laser resonator. The concave primary reflector 92 includes a central aperture generally designated 96. A concave segment 98 is provided along the optical axis of the optical cavity and exteriorly spaced from and rigidly connected to the primary reflector 92. In this embodiment, a light extractor 100 is removably positioned exteriorly of the optical cavity along the optical axis and intermediate the concave segment 98 and the opening 96 in the primary reflector 92. The light extractor 100 is operative during the interpulse intervals to deviate any selected two or more annular received beams of selected different magnifications through imaging optics 102 and onto a sensor 104 located at the focal plane of the optics 102. As described above in connection with the description of the embodiment of FIG. 5, it will be appreciated that the dimension of the aperture 98, and the dimensions of the partially reflecting and totally reflecting portions of the light extractor 100, are so selected as to correspond to the the particular "telescoped" beam sizes of the preselected two or more annular beams of selected different magnifications. It should be noted that the extracavity position of the extractor 100 relaxes intracavity real estate usage constraints.

It should be noted that two or more apertured reflectors exteriorly spaced to each other and to the primary reflector, not shown, is also contemplated. The several reflectors in this embodiment are each dimensioned to deviate a corresponding one of two or more selected annular received beams of selected different magnification and beam size onto an associated sensor. The respective sensor signals provide gross and fine boresight alignment.

It will be appreciated that many modifications of the presently disclosed invention will become apparent to those skilled in the art without departing from the scope of the appended claims.

What is claimed is:

1. An alignment system for a confocal unstable laser resonator having a concave primary reflector and a spaced-apart convex secondary reflector defining such an optical cavity having a magnification factor "M", an optical aperture, and an optical axis that optical energy received by the optical aperture of the optical cavity oscillates between the cavity reflectors, where for each round trip oscillation "n" between the cavity reflectors, the received optical energy defines a corresponding one of plural optical energy annular beams respectively having a spot size inversely proportional to "$M^n$" and a magnification proportional to "$M^n$", for non-negative integer values of "n", comprising:

means for extracting two received optical energy annular beams of selected different magnification and corresponding spot size out of said optical cavity; and means optically coupled to said extracting means and responsive to said at least two received optical energy annular beams of selected different magnification and spot size for detecting the degree of relative co-axial mis-alignment therebetween.

2. The invention of claim 1, wherein said extracting means includes an intra-cavity specular member having a partially reflecting first portion whose dimension is selected to correspond to the spot size of one of said received optical energy annular beams of selected magnification, said intracavity specular member having a totally reflecting second portion whose dimension is selected to correspond to the spot size of the other one of said received optical energy annular beams of selected magnification.

3. The invention of claim 2, wherein said detecting means includes a light-responsive sensor.

4. The invention of claim 1, wherein said primary reflector includes a central aperture; and wherein said extracting means includes an extracavity specular member in spaced-apart relation to and fixedly connected to the primary reflector and positioned along the optical axis of the optical cavity, said specular member having a partially reflecting first portion whose dimension is selected to correspond to the spot size of one of said received optical energy annular beams of selected magnification, and said specular member having another totally reflecting second portion whose dimension is selected to correspond to the spot size of the other one of said received optical energy annular beams of selected magnification.

5. The invention of claim 4, wherein said detecting means includes a light-responsive sensor.

* * * * *